United States Patent [19]

Schiff

[11] Patent Number: 5,489,054
[45] Date of Patent: Feb. 6, 1996

[54] EXTENDIBLE VEHICLE TRAY METHOD AND APPARATUS

[75] Inventor: Jon D. Schiff, St. Joseph, Mich.

[73] Assignee: Atlantic Automotive Components, Inc., Benton Harbor, Mich.

[21] Appl. No.: 292,108

[22] Filed: Aug. 17, 1994

[51] Int. Cl.⁶ ............................. B60N 3/12; B60N 3/10
[52] U.S. Cl. ............. 224/281; 248/311.2; 224/926; 296/37.1; 296/37.9; 297/188.14; 297/188.17
[58] Field of Search .................... 224/281, 926; 248/311.2; 296/37.1, 37.8, 37.9, 37.11; 297/188.14, 188.15, 188.16, 188.17; 49/379; 312/319.1, 330.1, 348.3, 310

[56] References Cited

U.S. PATENT DOCUMENTS

| | | |
|---|---|---|
| 4,286,742 | 9/1981 | Pellegrino . |
| 4,417,764 | 11/1983 | Marcus et al. ............... 297/188.17 |
| 4,453,759 | 6/1984 | Kathiria . |
| 4,494,806 | 1/1985 | Williams et al. . |
| 4,660,881 | 4/1987 | Komeya et al. ................... 224/281 |
| 4,712,845 | 12/1987 | Nicol ................................ 296/37.9 |
| 4,953,771 | 9/1990 | Fischer et al. ...................... 224/926 |
| 4,981,277 | 1/1991 | Elwell ............................... 224/926 |
| 5,024,411 | 6/1991 | Elwell ............................... 224/926 |
| 5,052,728 | 10/1991 | Fukumoto .......................... 224/926 |
| 5,060,899 | 10/1991 | Lorance et al. .................... 224/926 |
| 5,284,314 | 2/1994 | Misaras et al. ..................... 224/296 |

FOREIGN PATENT DOCUMENTS 204143  8/1990  Japan ............................ 224/281

Primary Examiner—Henry J. Recla
Assistant Examiner—Charles R. Eloshway
Attorney, Agent, or Firm—Brooks & Kushman

[57] ABSTRACT

An extendible tray for a vehicle includes a housing mounted in the vehicle and a carrier movably connected with respect to the housing. The carrier is movable between a stored position inside the housing, a first use position outside the housing to expose a first portion of the carrier, and a second use position outside the housing to expose both the first and second portions of the carrier. The carrier is biased outwardly from the housing, and first and second latches are provided to retain the carrier in the stored position and the first use position. When a user pushes the carrier in the direction of the housing, the spring and latches facilitate movement of the carrier from the stored position to the first use position and from the first use position to the second use position. A method for storing an ashtray and a cupholder in a vehicle housing is also provided. In addition, a method for providing access to an ashtray and a cupholder for rear seat passengers in a vehicle is provided.

17 Claims, 4 Drawing Sheets

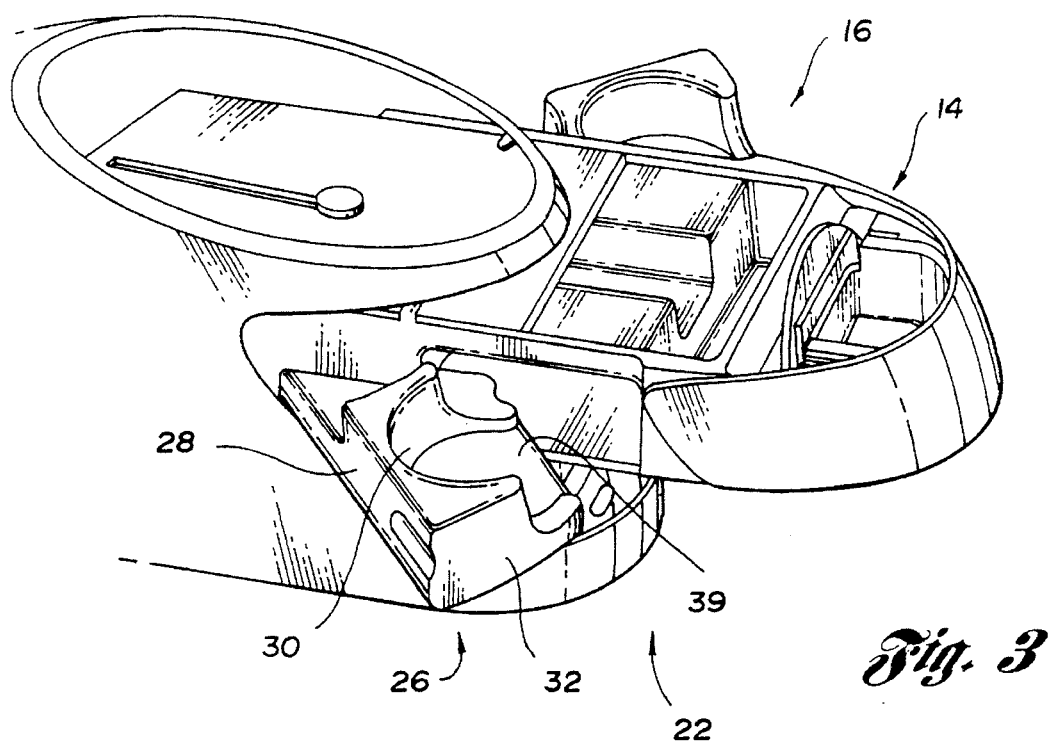
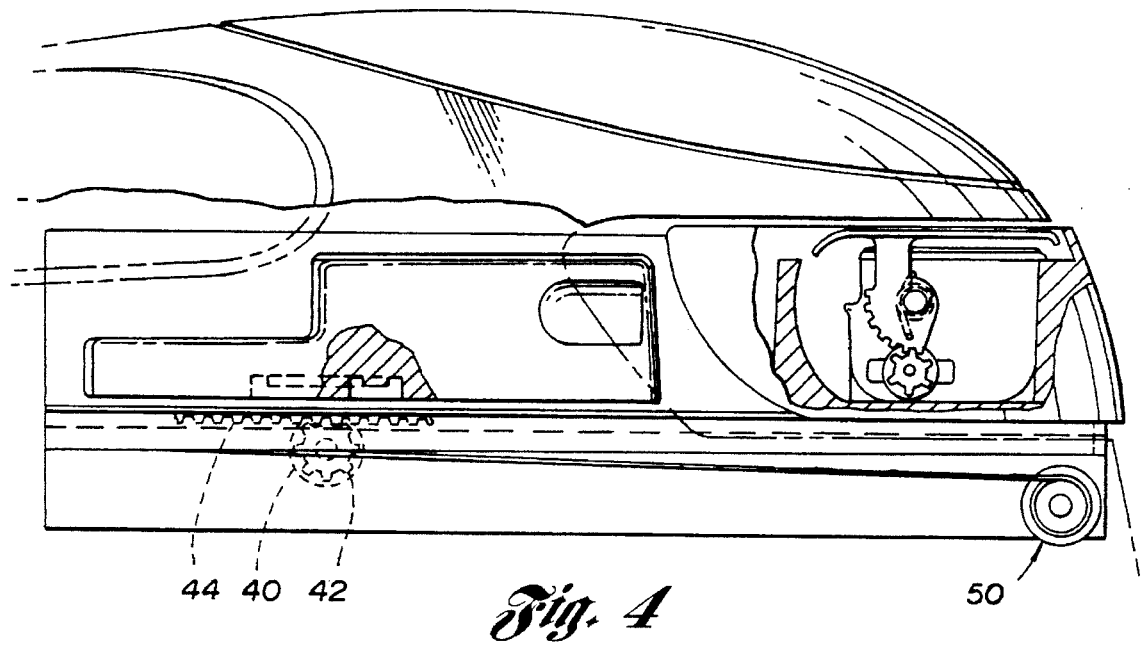

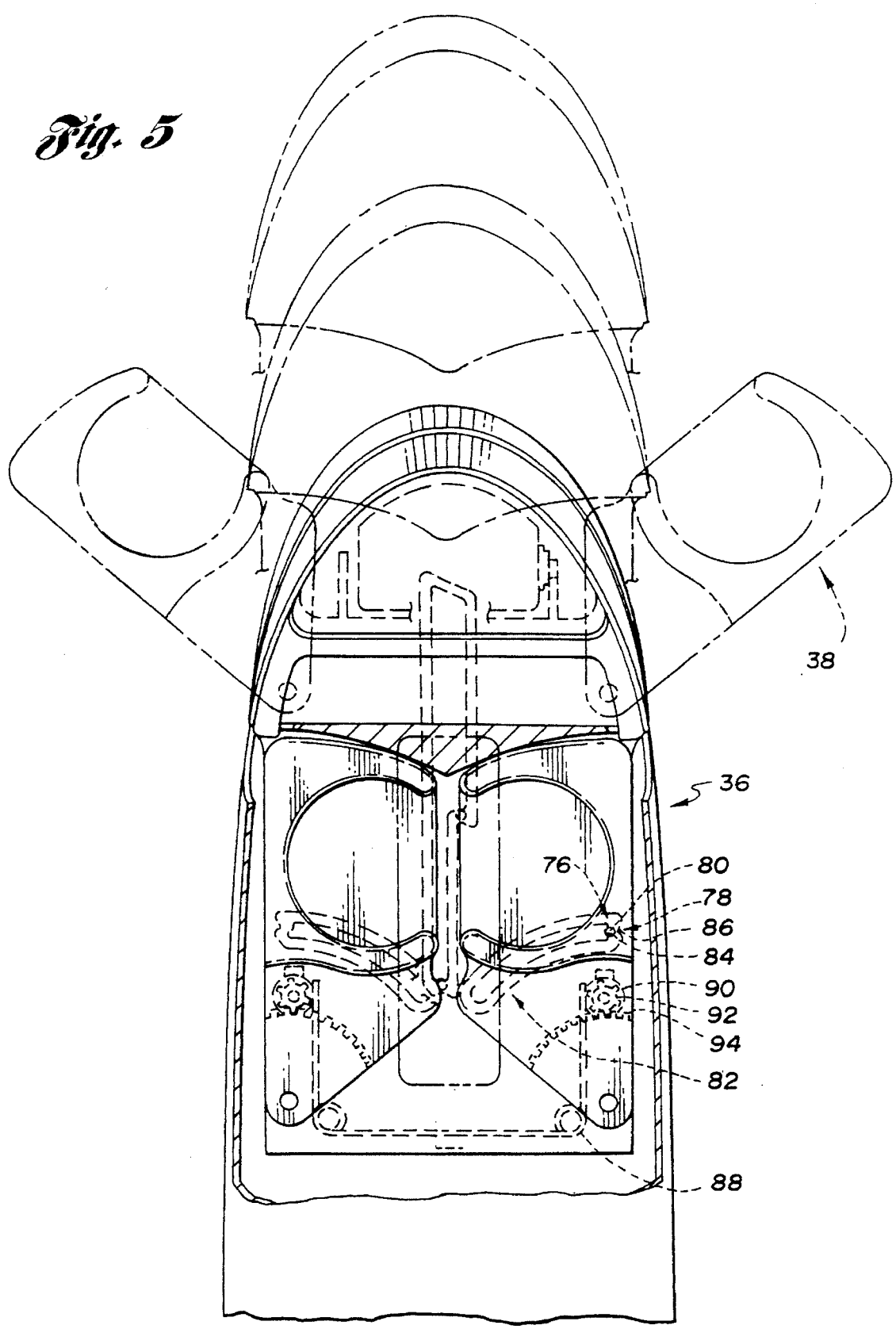

EXTENDIBLE VEHICLE TRAY METHOD AND APPARATUS

TECHNICAL FIELD

The present invention relates to trays in vehicle passenger compartments and more particularly to the mounting of such trays in a vehicle housing.

BACKGROUND ART

Passengers traveling by automobile or other motor vehicle frequently find it useful or enjoyable to consume beverages or to smoke cigarettes while en route. Such travelers may carry with them individual bottles or cans of their favorite beverage, and may also carry cigarettes. However, many beverage containers are very light and easily upset while traveling in a vehicle, therefore cupholders are often provided in vehicle passenger compartments. Also, ashtrays are commonly provided for easy access to smoking passengers.

Consequently a number of devices have been developed which provide cupholders or ashtrays to vehicle passengers. Some such cupholder trays or ashtray receptacles are provided in U.S. Pat. No. 4,453,759 to Kathiria, U.S. Pat. No. 4,953,771 to Fischer, U.S. Pat. No. 5,024,411 to Elwell, U.S. Pat. No. 4,927,108 to Blazic and U.S. Pat. No. 4,953,772 to Phifer.

Among the deficiencies noted in the prior art devices is that they use valuable interior space and usable surfaces in the passenger compartment to perform a function for which demand is intermittent. Also, devices may detract from the aesthetic appearance of the passenger compartment. In addition, the prior art provides no known trays which provide both cupholder and ashtray access to vehicle occupants.

Accordingly, it is desirable to develop a vehicle tray which carries a cupholder, and an ashtray, or other storage devices. It is also desirable to provide such a tray which does not detract from the aesthetic appearance of a vehicle passenger compartment.

DISCLOSURE OF THE INVENTION

Responsive to the deficiencies in the prior art, the present invention provides an extendible tray for a vehicle including a housing mounted in the vehicle and a carrier movably connected with respect to the housing, the carrier having first and second portions. Means are provided for moving the carrier between a stored position inside the housing, a first use position outside the housing to expose the first portion of the carrier, and a second use position outside the housing to expose both the first and second portions of the carrier. The means for moving the carrier includes a first latch for retaining the carrier in the stored position. The first latch includes a first release mechanism responsive to relative movement of the carrier in the direction away from the second use position to permit movement of the carrier to the first use position. The means for moving the carrier also includes a second latch for retaining the carrier in the first use position. The second latch includes a second release mechanism responsive to further movement of the carrier in the direction away from the second use position to permit movement of the carrier to the second use position.

A preferred extendible tray according to the present invention is an improvement over a tray slidably mounted in a housing contained in a vehicle passenger compartment for movement substantially into the housing for storage and substantially out of the housing to expose the tray. The improvement includes means for controlling the movement of the tray. The improvement is characterized in that latches are disposed between the tray and the housing and are operative to prevent movement of the tray out of the housing once the tray has been moved substantially into the housing to a storage position. The latches are further operative to permit movement to a first use position upon certain further movement of the tray into the housing. Also, the latches permit movement of the tray from the first use position to a second use position upon further movement of the tray in the direction toward the housing.

The present invention further contemplates a method for storing an ashtray and a cupholder in a vehicle housing, including providing a housing within the vehicle and slidably mounting a carrier with respect to the housing. The carrier has an ashtray and cupholder attached thereto, such that the carrier is movable between a stored position substantially inside the housing wherein the ashtray and cupholder are concealed, a first use position partially outside the housing wherein the ashtray is exposed, and a second use position substantially outside the housing wherein both the cupholder and the ashtray are exposed. The method further includes biasing the carrier toward the second use position with respect to the housing and cammingly engaging the carrier with respect to the housing, such that the carrier is permitted to travel from the stored position to the first use position upon movement of the carrier in the direction away from the second use position. The carrier is also permitted to travel from the first use position to the second use position upon certain further movement of the carrier in the direction away from the second use position. In addition, the carrier is retained in the stored position after it is moved substantially to the stored position from the second use position.

In addition, the present invention contemplates a method for providing access to an ashtray and a cupholder for rear seat passengers in vehicle, including slidably mounting a carrier with respect to a rear portion of a vehicle center console. The carrier is provided with an ashtray and cupholder attached thereto, such that the carrier is movable between a stored position substantially inside the console wherein the ashtray and cupholder are concealed, a first use position partially outside the console wherein the ashtray is exposed to the rear seat passengers, and a second use position substantially outside the console wherein both the cupholder and the ashtray are exposed to the rear seat passengers. The method further contemplates biasing the carrier toward the second use position with respect to the console and cammingly engaging the carrier with respect to the console, such that the carrier is permitted to travel from the stored position to the first use position upon movement of the carrier in the direction away from the second use position. The carrier is further permitted to travel from the first use position to the second use position upon certain further movement of the carrier in the direction away from the second use position. Furthermore, the carrier is retained in the stored position after it is moved substantially to the stored position from the second use position.

Accordingly, an object of the present invention is to provide an extendible tray for a vehicle housing which provides both a cupholder and an ashtray to vehicle passengers.

Another object of the present invention is to provide an extendible tray for a vehicle which does not detract from the aesthetic appearance of the passenger compartment.

A further object of the present invention is to provide an extendible tray for a vehicle which may be stored and easily extended intermittently for passenger use.

A still further object of the present invention is to provide an extendible tray for a vehicle having a latch mechanism which provides for movement between a plurality of positions with respect to the vehicle housing.

Yet another object of the present invention is to provide an extendible tray for a vehicle which does not detract from available passenger space, surface space or leg room.

These and other objects, features and advantages of the present invention will be more thoroughly understood with reference to the accompanying drawings and description.

BRIEF DESCRIPTION OF THE DRAWINGS

FIG. 3 is a perspective view of an extendible tray according to the present invention, the tray being in a second use position.

FIG. 4 is a vertical cross-section of an extendible tray according to the present invention, the tray being in the stored position.

FIG. 5 is a cut away plan view of an extendible tray according to the present invention, the tray being in the stored position, and shown in a second use position in phantom.

BEST MODES FOR CARRYING OUT THE INVENTION

Figure 1:
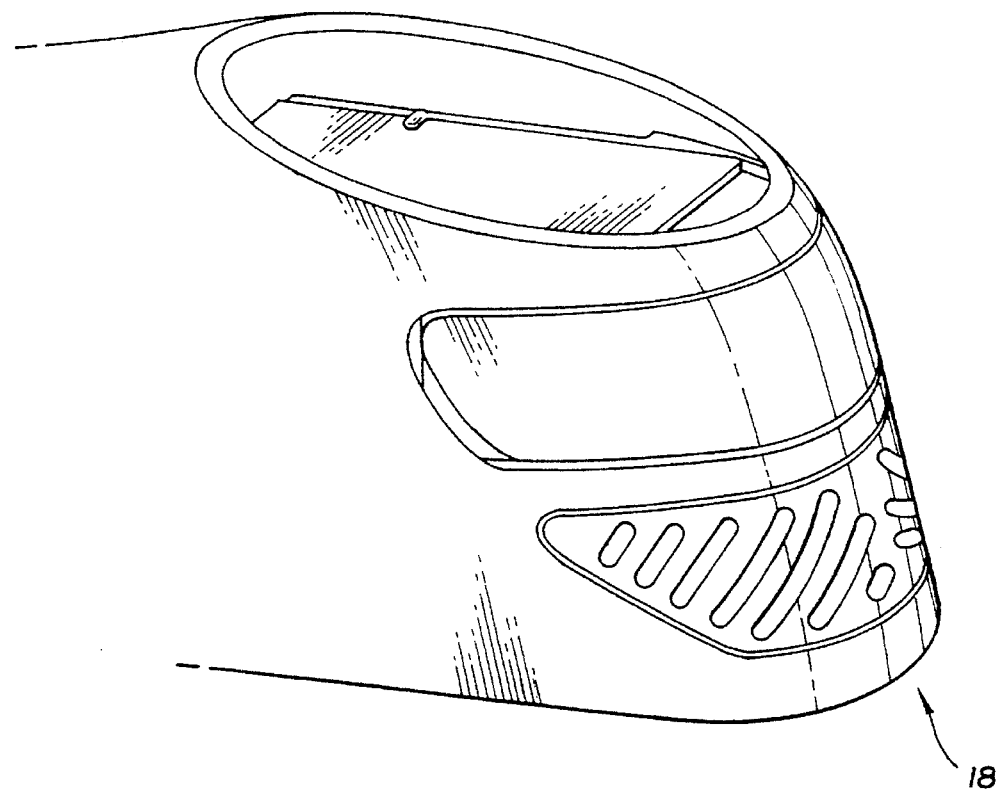
FIG. 1 is a perspective view of an extendible tray in a vehicle console according to the present invention, the tray being in the stored position.
Figure 2:
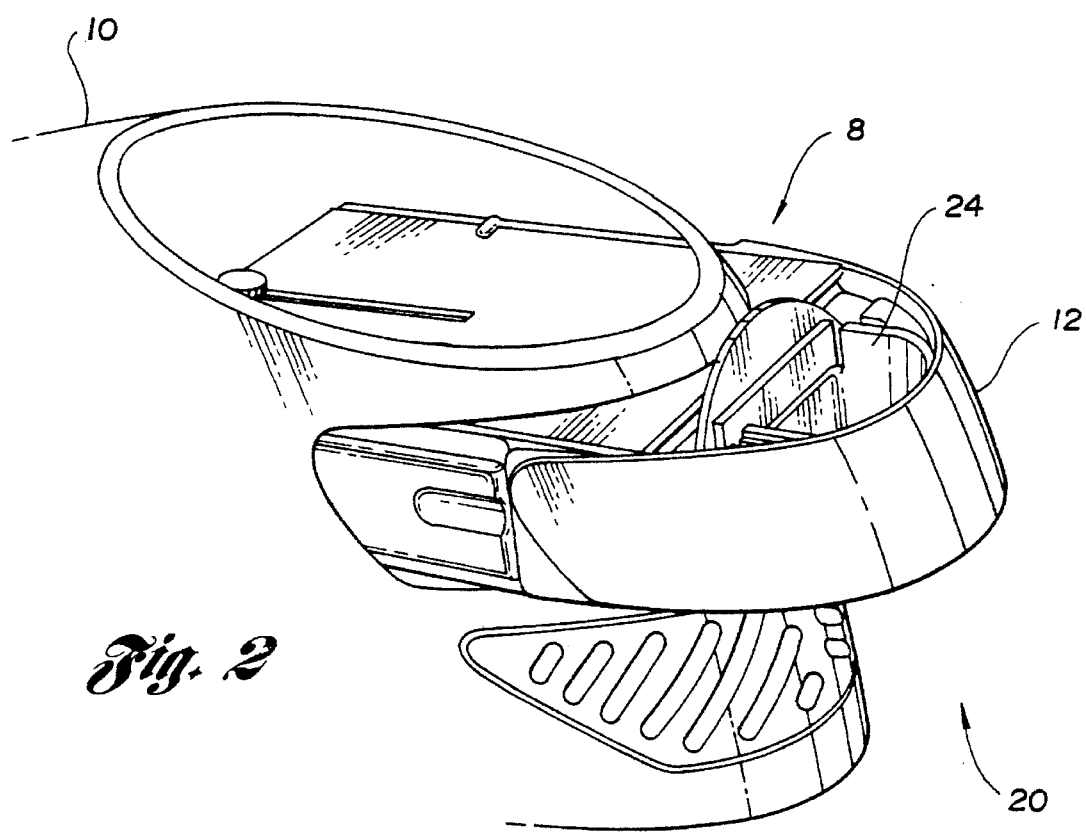
FIG. 2 is a perspective view of an extendible tray according to the present invention, the tray being in a first use position.

Referring to FIGS. 1–5, an extendible tray 8 for a vehicle according to the present invention is shown. A housing 10 is mounted in the vehicle as shown. A carrier 12 is movably connected with respect to the housing 10, the carrier 12 having first and second portions 14,16 thereof. The extendible tray 8 includes means for moving the carrier 12 between a stored position 18 inside the housing 10, as shown in FIG. 1; a first use position 20 outside the housing 10 to expose the first portion 14 of the carrier 12, as shown in FIG. 2; and a second use position 22 outside the housing 10 to expose both the first and second portions 14,16 of the carrier 12, as shown in FIG. 3.

An ashtray 24 is connected to the first portion 14 of the carrier 12 such that the ashtray 24 is exposed to a user when the carrier 12 is in the first position 20, as shown in FIG. 2.

The extendible tray further includes a cupholder 26 connected to the second portion 16 of the carrier such that the cupholder 26 is exposed to a user when the carrier is in the second use position 22, as shown in FIG. 3. The cupholder 26 includes at least one wing-like arm 28 pivotally mounted to the carrier. The arm 28 forms a partially cylindrical shaped vertical aperture 30 adjacent a distal end 32 of the cupholder 26, and has a bottom support member 34 adapted to receive and support a cup. The wing-like arm 28 is pivotable between a cupholder storage position 36 and a cupholder use position 38, as shown in phantom in FIG. 5.

The extendible tray further includes a rotary viscous damper 40 which provides damping means between the housing and the carrier for damping motion of the carrier relative to the housing. A rotatable gear 42 is connected to the rotary damper 40. The teeth of the rotatable gear are engageable with the teeth of a rack 44 which is mounted to the housing. This operative connection of the rotary damper 40, the rotatable gear 42, and the rack 44 between the carrier and the housing provides damping for motion of the carrier relative to the housing.

Referring to FIG. 4, a rotary spring 50 biases the carrier away from the stored position 24 with respect to the housing.

Figure 6:
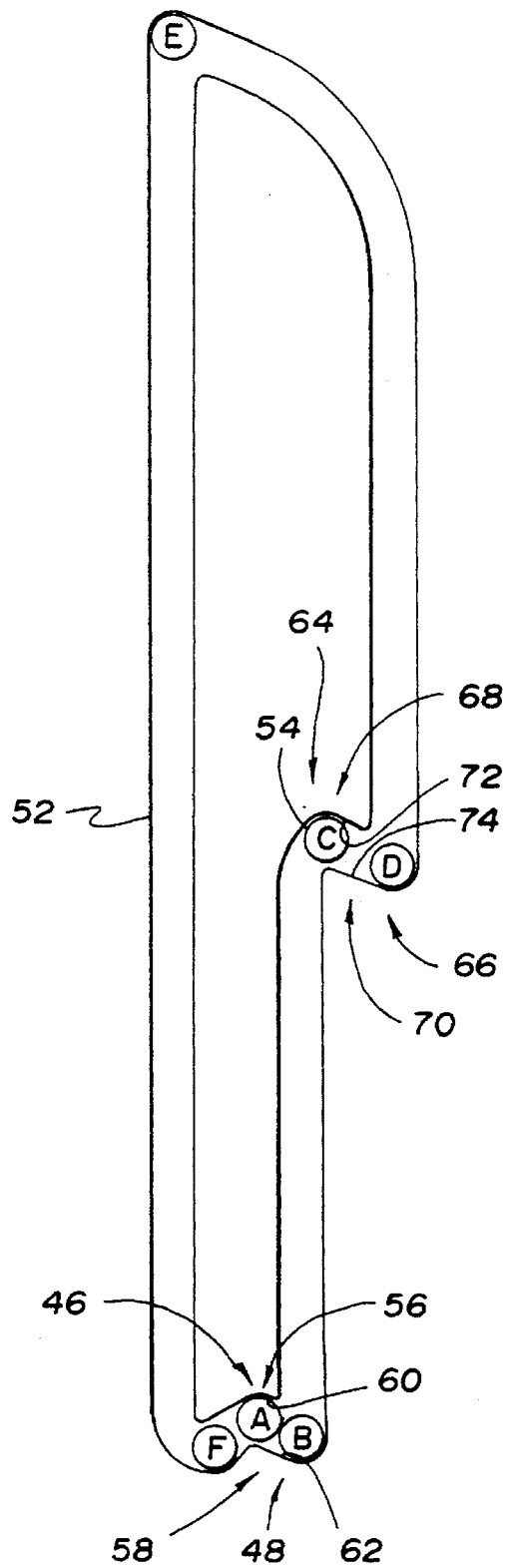
FIG. 6 is an enlarged fragmentary plan view of a first cam track according to the present invention.

As shown in FIGS. 5 and 6, the means for moving the carrier includes a first latch 46 for retaining the carrier in the stored position 18. The first latch 46 includes a first release mechanism 48 responsive to relative movement of the carrier in the direction away from the second use position 22 to permit movement of the carrier to the first use position 20. In other words, if a user desires access to the tray, the user simply pushes the carrier into the housing and the first latch 46 releases the carrier. Once the carrier has been released by the first latch 46, the rotary spring 50 will force the carrier out to the first use position 20.

The first latch 46 includes a first cam track 52 and a follower 54, the first cam track 52 having a first portion 56 in cooperative relationship with the follower 54 to retain the carrier in the stored position 18 and having a second portion 58 in selective cooperation with the follower 54 to form the first release mechanism 48.

The first portion 56 of the first cam track 52 includes a first inner edge 60 thereof for selective cooperation with the follower 54 after the carrier is moved into the stored position 18 in the housing.

The first release mechanism 48 includes a first outer edge 62 of the first cam track 52 for selective cooperation with the follower 54 in response to movement of the carrier in the direction away from the second use position 22.

The means for moving the carrier further includes a second latch 64 for retaining the carrier in the first use position 20. The second latch 64 includes a second release mechanism 66 responsive to the further movement of the carrier in the direction away from the second use position 22 to permit movement of the carrier to the second use position 22. When the user would like the carrier to move from the first use position 20 to the second use position 22, the user simply pushes the carrier 12 toward the housing 10. This movement causes the second latch 64 to release the carrier, and the rotary spring 50 moves the carrier to the second position 22.

The second latch 64 includes a third portion 68 of the first cam track 52 in cooperative relationship with the follower 54 to retain the carrier in the first use position 20 and has a fourth portion 70 in selective cooperation with the follower 54 to form the second release mechanism 66. The third portion 68 of the first cam track 52 includes a second inner edge 72 thereof for selective cooperation with the follower 54 after the carrier is moved into the first use position 20.

The second release mechanism 66 includes a second outer edge 74 of the first cam track 52 for selective cooperation with the follower 54 in response to further movement of the carrier in the direction away from the second use position 22.

FIG. 6 illustrates movement of the follower 54 through the first cam track 52. When the carrier is in the stored position 18, the follower is in position A resting against the first inner edge 60 of the cam track as a result of the force of the rotary spring 50. When a user would like the tray to move from the stored position 18 to the first use position 20, the user pushes the carrier into the housing which causes the follower 54 to move along the first outer edge 62 of the cam track to position B. The user then releases the carrier and the spring moves the follower along the cam track from position B to position C, where the follower rests against the second inner edge 72 of the cam track. When the user desires the carrier to be in the second use position, the user pushes the carrier toward the housing which causes the follower to ride against the second outer edge 74 of the cam track to position D. The user then releases the carrier and the spring forces the follower to travel along the cam track from position D to position E, and the carrier is in the second use position. When the user wishes to restore the carrier, the user pushes the carrier in the direction toward the housing and the follower travels along the cam track from position E to position F. The user then releases the carrier, and the follower moves from position F to the stored position A.

Means are provided for moving the at least one wing-like arm 28 between the cupholder storage position 36 and the cupholder use position 38. The means for moving the at least one wing-like arm 28 includes a third latch 76 for retaining the arm 28 in the cupholder storage position 36. The third latch 76 further includes third release mechanism 78 responsive to relative movement of the arm 28 in the direction away from the cupholder use position 38 to permit movement of the arm 28 to the cupholder use position to expose the cupholder. This allows passengers to extend an arm when necessary by pushing the arm toward the housing, and to store the arm when extra leg room is needed by returning the arm to the cupholder storage position.

The third latch 76 includes a second follower 80 and a second cam track 82. The second cam track 82 has a first portion 84 in selective cooperation with the second follower 80 to retain the cupholder in the cupholder storage position, and the second cam track 82 has a second portion 86 in selective cooperation with the second follower 80 to form the third release mechanism 78.

The arm 28 is biased toward the cupholder use position 38 by the torsion spring 88. The motion of the arm 28 is dampened by a second rotary viscous damper 90, which is operatively connected between the carrier and a second rotatable gear 92. The teeth of the rotatable gear 92 are engageable with the teeth of a second rack 94. Thereby, the motion of the arm 28 toward the cupholder use position is dampened. U.S. Pat. No. 4,614,004 to Oshida, herein incorporated by reference, discloses a rotary viscous damper suitable for use in this application.

A preferred method for storing an ashtray 24 and a cupholder 26 in a vehicle housing 10 is also provided. The method includes providing a housing 10 within the vehicle and slidably mounting a carrier 12 with respect to the housing 10. The carrier has an ashtray and cupholder attached thereto, such that the carrier is movable between a stored position 18 substantially inside the housing wherein the ashtray and cupholder are concealed, a first use position 20 partially outside the housing wherein the ashtray is exposed, and a second use position 22 substantially outside the housing wherein both the cupholder and the ashtray are exposed. The method further includes biasing the carrier toward the second use position 22 with respect to the housing and cammingly engaging the carrier with respect to the housing, such that the carrier is permitted to travel from the stored position 18 to the first use position 20 upon movement of the carrier in the direction away from the second use position. The carrier is also permitted to travel from the first use position 20 to the second use position 22 upon certain further movement of the carrier in the direction away from the second use position. In addition, the carrier is retained in the stored position 18 after it is moved substantially to the stored position from the second use position.

A preferred method for providing access to an ashtray and a cupholder for rear seat passengers in a vehicle is also provided herein. The method includes slidably mounting a carrier 12 with respect to a rear portion of a vehicle center console 10. The carrier 12 is provided with an ashtray 24 and a cupholder 26 attached thereto, such that the carrier is movable between a stored position 18 substantially inside the console wherein the ashtray and cupholder are concealed, a first use position 20 partially outside the console wherein the ashtray is exposed to the rear seat passengers, and a second use position 22 substantially outside the console wherein both the cupholder and the ashtray are exposed to the rear seat passengers. The method further contemplates biasing the carrier toward the second use position 22 with respect to the console and cammingly engaging the carrier with respect to the console, such that the carrier is permitted to travel from the stored position 18 to the first use position 20 upon movement of the carrier in the direction away from the second use position 22. The carrier is further permitted to travel from the first use position 20 to the second use position 22 upon certain further movement of the carrier in the direction away from the second use position 22. Furthermore, the carrier is retained in the stored position 18 after it is moved substantially to the stored position from the second use position.

While the best modes for carrying out the invention have been described in detail, those familiar with the art to which the invention relates will recognize various alternative designs and embodiments for practicing the invention as defined by the following claims.

What is claimed is:

1. An extendible tray for a vehicle, comprising:

a housing adapted to be mounted in the vehicle;

a carrier movably connected to the housing, the carrier having first and second portions;

means for moving the carrier between a stored position inside the housing, a first use position partially outside the housing to expose the first portion of the carrier, and a second use position outside the housing to expose both the first and second portions of the carrier; and said means for moving the carrier including a first latch for retaining the carrier in the stored position, the first latch including a first release mechanism responsive to relative movement of the carrier in a direction away from the second use position to permit movement of the carrier to the first use position, the means for moving the carrier further including a second latch for retaining the carrier in the first use position, the second latch including a second release mechanism responsive to further movement of the carrier in said direction away from the second use position to permit movement of the carrier to the second use position.

2. The extendible tray of claim 1, further comprising an ashtray connected to the first portion of the tray such that the ashtray is exposed to a user when the tray is in the first use position.

3. The extendible tray of claim 2, further comprising a cupholder connected to the second portion of the tray such that the cupholder is exposed to a user when the tray is in the second use position.

4. The extendible tray of claim 3, wherein the cupholder comprises at least one wing-like arm pivotably mounted to the carrier, the arm forming a partially cylindrical shaped vertical aperture adjacent a distal end of the cupholder and having a bottom support member adapted to receive and support a cup, said arm being pivotable between a cupholder storage position and a cupholder use position, said arm further being biased toward said cupholder use position.

5. The extendible tray of claim 4, further comprising means for moving the at least one wing-like arm between the cupholder storage position and the cupholder use position.

6. The extendible tray of claim 5, wherein the means for moving the at least one wing-like arm comprises a third latch for retaining the arm in the cupholder storage position, the third latch including a third release mechanism responsive to relative movement of the arm in the direction away from the cupholder use position to permit movement of the arm to the cupholder use position to expose the cupholder.

7. The extendible tray of claim 6, wherein the third latch comprises a second cam track and a second follower, the second cam track having a first portion in selective cooperation with the second follower to retain the cupholder in the cupholder storage position and having a second portion in selective cooperation with the second follower to form the third release mechanism.

8. The extendible tray of claim 1, further comprising damper means operatively connected between the housing and the carrier for damping motion of the carrier relative to the housing.

9. The extendible tray of claim 8, wherein the damper means comprises:
   a rotatable gear;
   a rotary viscous damper operatively connected between the rotatable gear and the carrier for damping the rotary motion of the rotatable gear; and
   a rack mounted to the housing, the rack having teeth engageable with the teeth of the rotatable gear.

10. The extendible tray of claim 1, wherein the first latch comprises a first cam track and a follower, the first cam track having a first portion in cooperative relationship with the follower to retain the carrier in the stored position and having a second portion in selective cooperation with the follower to form the first release mechanism.

11. The extendible tray of claim 10, wherein the first portion of the first cam track includes a first inner edge thereof for selective cooperation with the follower after the carrier is moved into the stored position in the housing.

12. The extendible tray of claim 10, wherein the first release mechanism includes a first outer edge of the first cam track for selective cooperation with the follower in response to said movement of the carrier in said direction away from the second use position.

13. The extendible tray of claim 10, wherein the second latch comprises a third portion of the first cam track in cooperative relationship with the follower to retain the carrier in the first use position and having a fourth portion in selective cooperation with the follower to form the second release mechanism.

14. The extendible tray of claim 13, wherein the third portion of the first cam track includes a second inner edge thereof for selective cooperation with the follower after the carrier is moved into the first use position.

15. The extendible tray of claim 13, wherein the second release mechanism includes a second outer edge of the first cam track for selective cooperation with the follower in response to said further movement of the carrier in said direction away from the second use position.

16. A method for storing an ashtray and a cupholder in a vehicle housing, comprising:
   providing a housing within the vehicle;
   slidably mounting a carrier with respect to the housing, the carrier having an ashtray and cupholder attached thereto, such that the carrier is movable between a stored position substantially inside the housing wherein the ashtray and cupholder are concealed, a first use position partially outside the housing wherein the ashtray is exposed, and a second use position substantially outside the housing wherein both the cupholder and the ashtray are exposed;
   biasing the carrier toward the second use position with respect to the housing; and
   cammingly engaging the carrier with respect to the housing, such that: the carrier is permitted to travel from the stored position to the first use position upon movement of the carrier in a direction away from the second use position; the carrier is permitted to travel from the first use position to the second use position upon certain further movement of the carrier in said direction away from the second use position; and the carrier is retained in the stored position after it is moved substantially to the stored position from the second use position.

17. A method for providing access to an ashtray and a cupholder for rear seat passengers in a vehicle, comprising:
   slidably mounting a carrier with respect to a rear portion of a vehicle center console, the carrier having an ashtray and cupholder attached thereto, such that the carrier is movable between a stored position substantially inside the console wherein the ashtray and cupholder are concealed, a first use position partially outside the console wherein the ashtray is exposed to rear seat passengers, and a second use position substantially outside the console wherein both the cupholder and the ashtray are exposed to the rear seat passengers;
   biasing the carrier toward the second use position with respect to the console; and
   cammingly engaging the carrier with respect to the console, such that: the carrier is permitted to travel from the stored position to the first use position upon movement of the carrier in a direction away from the second use position; the carrier is permitted to travel from the first use position to the second use position upon certain further movement of the carrier in said direction away from the second use position; and the carrier is retained in the stored position after it is moved substantially to the stored position from the second use position.

* * * * *